United States Patent [19]

Branlard et al.

[11] 3,899,459

[45] Aug. 12, 1975

[54] PRODUCTION OF POLYCHLOROPRENE

[75] Inventors: Paul Branlard, Grenoble; Jacques Modiano, Varces, both of France

[73] Assignee: Distugil, Clichy, France

[22] Filed: June 8, 1973

[21] Appl. No.: 368,360

[30] Foreign Application Priority Data

July 4, 1972  France .............................. 72.24839

[52] U.S. Cl. ...... 260/27 BB; 260/23.7 H; 260/27 R; 260/29.3 R
[51] Int. Cl.$^2$ ......................................... C08L 93/00
[58] Field of Search ......... 260/27 BB, 27 R, 23.7 H, 260/32, 29.3

[56] References Cited

UNITED STATES PATENTS

| | | | |
|---|---|---|---|
| 2,264,173 | 11/1941 | Collins | 260/32 |
| 2,918,442 | 12/1958 | Gerrard | 260/29.3 |
| 3,190,865 | 6/1965 | Miller | 260/23.7 H |

*Primary Examiner*—Donald E. Czaja
*Assistant Examiner*—William E. Parker
*Attorney, Agent, or Firm*—Browdy and Neimark

[57]  ABSTRACT

Polychloroprene is prepared by polymerization in the presence of a binary system of saturated and/or unsaturated fatty acids and/or an alkali-metal salt thereof and modified rosin acid derivatives.

8 Claims, No Drawings

PRODUCTION OF POLYCHLOROPRENE

FIELD OF THE INVENTION

The present invention relates to a process for the manufacture of polychloroprene rubber which does not cause phase separation in adhesive compositions in which it is incorporated, and also to the adhesives compositions produced from the polychloroprene rubber. It relates also to the resultant rubber, which shows a good resistance to natural ageing, a property which enables the rubber to retain its viscosity, and to avoid any cross-linking which is harmful to its suitability for use.

BACKGROUND OF THE INVENTION

The use of polychloroprene as a basic product in adhesives and glues has been known for a long time. The rubber is generally mixed with a small quantity of zinc oxide and this mix is blended with phenolic resins which have been reacted with an excess of magnesia. These resins, which are referred to as being prereacted with magnesium, impart to the adhesive mixture better mechanical properties and a good resistance to heat.

The mixing of these various compounds is carried out in solvent mixtures of various compositions. The adhesive or the glue is obtained in the form of an opaque suspension of magnesium oxide and zinc oxide, dispersed in the solution of polychloroprene rubber and phenolic resin which has been prereacted.

Unfortunately, under the usual conditions, the final adhesive mixture generally presents the undesirable characteristic of separating into two phases. The suspension is not stable. After some time, the length of which depends on the composition of the solvent mixture and the nature of the phenolic resin, a phenomenon of de-stabilization and of sedimentation develops, causing the appearance of a top layer which is at first translucent, gradually becoming transparent, while the bottom layer remains very opaque. This phenomenon, known as phase separation, does not affect the quality of the adhesive, since after agitation the initial mixture reforms normally, but it is nevertheless annoying from a commercial point of view. The different grades of polychloroprene rubber on the market all lead to adhesives showing this phenomenon to a more or less marked degree. On the other hand, the resistance to ageing of the polychloroprene rubber is usually acceptable.

It has been possible to show experimentally that this phase separation results from the formation of a complex between the magnesia, the phenolic resin and the rosin acids present in the polychloroprene: soaps of rosin acids are in current use in emulsion polymerization recipes. Proportions of 4 to 6% of rosin acid and/or its salts by weight in relation to the final polychloroprene are found in the product after the separation of the latter from its emulsifying system, by coagulation, washing and drying.

The complex thus formed, as a result of the large quantity of rosin acid present, is sparingly soluble in the solvent media generally employed. Due to the extreme fineness and the large volume, it exhibits a structure such that when it settles out, it takes with it the insoluble ingredients in suspension in the adhesive mixture.

The Applicants, in their U.S. Pat. application Ser. No. 310,105 of Nov. 28, 1972, now U.S. Pat. No. 3,872,043 have indicated the means by which to avoid this phenomenon, consisting in polymerizing the chloroprene in the presence of reduced quantities of rosin acids and of a moderate quantity saturated or unsaturated fatty acid. But under these conditions and especially when thiurams, such as tetramethyl thiuram disulphide or tetraethyl thiuram disulphide, are added at the end of the polymerization, a natural ageing behavior of the rubber is observed which is not as good as when higher contents of rosin acids are employed.

It appears that the rosin acids generally used in chloroprene polymerization, such as unmodified wood rosins, disproportionated wood rosins and hydrogenated wood rosins have a protective action and that they make it possible to reduce and slow down the cross-linking which occurs during storage. This cross-linking brings about an increase in the viscosity of the rubber, as measured by its Mooney viscosity, in solution, and at worst leads to the formation of large quantities of gel, thus making it very difficult and even impossible to use the polychloroprene. The protective action of the rosin acids is retained when these acids or a part of them are in the form of salts of, for example, sodium, potassium or ammonium, but practically disappears when the acid function is esterified. For example, the methyl alcohol, ethyl alcohol, glycerol or pentaerythritol esters mentioned in U.S. application Ser. No. 310,105 as tackifying agents show scarcely any protective effect.

In order to mitigate the above drawbacks, applicants have endeavored to find a system which makes it possible on the one hand to carry out the chloroprene polymerization at an acceptable rate to provide a latex having an acceptable stability and a resultant rubber having good resistance to ageing, and on the other hand, to avoid the subsequent formation of the phase separation phenomenon when the polychloroprene is mixed with the ingredients necessary to make up an adhesive mixture.

SUMMARY OF THE INVENTION

An object of the present invention is therefore to provide a polychloroprene latex which can be produced under acceptable industrial conditions using a binary system which does not set off the phase separation phenomenon when the polychloroprene is used in adhesive mixtures, and which imparts to the polychloroprene a good resistance to natural ageing, a property which enables the rubber to retain its viscosity and avoid any cross-linking which is harmful to its suitability for use.

Another object of the invention is the preparation of adhesive mixtures utilizing as a base the polychloroprene obtained according to the said process.

DESCRIPTION OF PREFERRED EMBODIMENTS

Accordingly, the present invention provides a process for the polymerization of chloroprene in the presence of a binary system containing from 1 to 2.5% of a saturated or unsaturated fatty acid or its alkali-metal salt and from 3 to 6% of a modified rosin acid derivative, said percentages being by weight of the weight of chloroprene monomer.

The protective effect against the phasing phenomenon is obtained with modified rosin derivatives such as dimerised or partially polymerized rosin acids, partially esterified dimerised rosin acids, oxidized wood rosins and in general, any acid of this group which is sufficiently modified so that it does not produce a phase separation by a mechanism similar to that indicated above in the case of simple rosin acids.

According to the method of preparation and the purity of these products, variable proportions of same may be introduced at the commencement of polymerization in whole or in part, in the latter case, the rest being added during the course of polymerization, or the entire amount may be added at the end of the polymerization.

The emulsifying system is based upon the use of saturated and/or unsaturated fatty acids. They may be used in the form of the acids as such, in the form of a mixture of acids and/or alkali-metal salts thereof or in the form of alkali metal salts such as sodium or potassium salts. Examples of fatty acids are lauric acid, myristic acid, stearic acid, oleic acid, palmetic acid and synthetic fatty acids.

In order to improve particularly the phenomenon of resistance to ageing, it is possible to add a small quantity of rosin acids to cause an improvement in the resistance to ageing without any appreciable effect on the phasing phenomenon. A content of between 0 and 0.5% by weight in relation to the chloroprene employed is perfectly admissible. As derivatives which may be employed, one may mention various kinds of wood rosins such as unmodified wood rosin, disproportionated wood rosin, and hydrogenated wood rosin. These materials may be present as such or as their alkaline soaps.

The respective proportions of these various products can be adjusted in such a way that the finished products present an adequate adhesive and retain very good properties in adhesive formulations.

Preferred products are obtained by using by weight in relation to the chloroprene:

a. between 1 and 2.5% of a $C_{10}$ to $C_{14}$ saturated fatty acid or of a $C_{12}$ to $C_{20}$ unsaturated fatty acid, b. 3 to 5% of a dimerised or partially polymerized rosin acid or 3 to 6% of dimerised acids partially esterified so that one acid function remains to one ester function, or, 3 to 6% of oxidized wood rosin, and c. optimally less then 0.5% of rosin acids.

It is, of course, always possible to add tackifying agents such as esters of unmodified, disproportionated or hydrogenated wood rosin. Methyl alcohol, ethyl alcohol, glycerol and pentaerythritol constitute the preferred alcohols for esterifying these wood rosins. One may also add as tackifiers terpene derivatives such as the polymers of $\alpha$- and $\beta$-pinene.

When operating in such a way in a binary or a ternary system (presence of rosin acids), chloroprene can be polymerized to 80% conversion, in acceptable reaction times of the order of 7 to 10 hours.

There now follow examples which illustrate the invention without, however, restricting it:

EXAMPLE 1.

The following are charged into a polymerization vessel:

|  | Parts by Weight |
|---|---|
| Chloroprene | 100 |
| Water | 100 |
| Dimerised rosin acids (DYMEREX of the HERCULES Company) | 1 |
| Sodium oleate | 2 |
| Caustic soda (100%) | 0.302 |
| Sodium salt of methylene-bis-alkylnapththalenesulphonic acids (Distabex LS of the Cie. Francaise des Matieres Colorantes) | 0.875 |
| n-dodecylmercaptan | 0.150 | with an initial catalyst consisting of:

|  | Parts by Weight |
|---|---|
| A) ferrous sulphate ($7H_2O$) | 0.00384 |
| disodium salt of ethylene-diamino-tetracetic acid (Masquol B, of the PROTEX Co.) | 0.00577 |
| Caustic Soda | 0.00124 |
| Water | 1.026 |
| B) Sodium dithionite | 0.0294 |
| Water | 0.588 |

The polymerization is carried out in 7 hours at +10°C, using a suitable flow of an aqueous solution of ammonium persulphate.

The polymerization is stopped at a conversion of 80% by the addition of the mixture:

|  | Parts by Weight |
|---|---|
| Chloroprene | 0.8 |
| Sodium lauryl sulphate | 0.02 |
| Phenothiazine | 0.01 |
| Water | 2.93 |

The following solution is then added:

|  | Parts by Weight |
|---|---|
| Dimerised rosin acids (DYMEREX of the HERCULES Co.) | 3 |
| Caustic soda (100%) | 0.308 |
| Di-tert. butyl paracresol | 0.4 |
| Chloroprene | 2.93 |
| Water | 5 |

The stripping and isolation of the latex are carried out according to the methods usually employed for polychloroprene. In particular, the isolation is carried out by coagulation of the latex, when it has been brought to a pH of 6.5, on a drum cooled to −20°C. The film is washed and then dried.

The increase of the Mooney viscosity of the rubber thus prepared and stored in an ageing oven at 70°C is as follows, in comparison with other rubbers:

| Mooney Viscosity | Initial | At 70°C after 3 days | 5 days | 10 days |
|---|---|---|---|---|
| Polychloroprene prepared according to Example 1 of the present invention | 82 | 78 | 81 | 85 |
| Polychloroprene prepared according to Example 1 of U.S. Patent Application S.N. 310,105 containing 2% disproportionated wood rosin | 87 | 94 | 96 | 102 |
| Polychloroprene containing 5% of disproportionated wood rosin | 79 | 74 | 77 | 81 |

EXAMPLE 2

The charging of the polymerization vessel according to Example 1 is modified as follows:

| Rosin acids: disproportionated wood rosin | Parts by Weight |
|---|---|
| (PHEDRE-V of the PASSICOS Co.) | 0.4 |
| Sodium oleate | 1.5 |
| Caustic soda (100%) | 0.25 |

The polymerization is effected in 7 hours under the conditions of Example 1.

After stopping the polymerization at a conversion of 80% under the conditions of Example 1, one adds the solution described in Example 1 modified as follows:

| | Parts by Weight |
|---|---|
| Dimerised rosin acids (DYMEREX of the HERCULES Co.) | 2.5 |
| Caustic Soda (100%) | 0.258 |

The increase of the Mooney viscosity of the rubber thus prepared and stored at 70°C in the ageing oven is as follows:

| Mooney viscosity ML 1 + 2 at 100°C | Initial | At 70°C after 3 days | 5 days | 10 days |
|---|---|---|---|---|
| Polychloroprene prepared according to Example 2 of the present invention | 77 | 74 | 75 | 79 |

EXAMPLE 3

The charging of the polymerization vessel according to Example 1 is modified as follows:

The disproportionated wood rosin and the dimerised rosin acids are replaced by

| | Parts by Weight |
|---|---|
| Sodium myristate | 2 |
| Caustic soda (100%) | 0.2 |

The polymerization is effected in 8 hours under the conditions of Example 1.

After stopping the polymerization at a conversion of 80% under the conditions of Example 1, the solution described in Example 1, modified as follows, is added:

The dimerised rosin acids are replaced by:

| | Parts by Weight |
|---|---|
| Crude oxidized wood rosin | 4 |
| Caustic soda (100%) | 0.45 |

The increase in the Mooney viscosity of the rubber thus prepared and stored at 70°C in the ageing oven is as follows:

| Mooney viscosity ML 1 + 2 at 100°C | Initial | At 70°C after 3 days | 5 days | 10 days |
|---|---|---|---|---|
| Polychloroprene prepared according to Example 3 of the present invention | 85 | 84 | 87 | 90 |

EXAMPLE 4

The charges and the reaction procedures are identical to those of Example 1, but the solution added at the end of the operation after the polymerization has been stopped at 80% is replaced by:

| | Parts by Weight |
|---|---|
| Dimerised rosin acid (DIMEREX, HERCULES Co.) | 3 |
| Caustic soda (100%) | 0.308 |
| Di-tert. butyl paracresol | 0.4 |
| Tetraethyl thiuram disulphide | 0.750 |
| Sodium lauryl sulphate | 0.140 |
| Chloroprene | 5.86 |
| Water | 15 |

The increase in the Mooney viscosity of the rubber thus prepared and stored at 70°C in the ageing oven is as follows, compared with that of a rubber in which all the dimersed rosin acid has been omitted, together with the corresponding quantity of caustic soda to neutralize it:

| Mooney viscosity ML 1 + 2 at 100°C | Initial | At 70°C after 3 days | 5 days | 10 days |
|---|---|---|---|---|
| Polychloroprene prepared according to Example 4 | 80 | 78 | 80 | 84 |
| Polychloroprene prepared according to Example 4 in the preparation of which the dimerised rosin has been omitted | 92 | 118 | gelled | gelled |

EXAMPLE 5

Operating under the conditions of Example 1, but replacing the sodium oleate by 2.2 parts of sodium laurate, the increase in the Mooney viscosity of the rubber thus prepared and stored at 70°C in the ageing oven is as follows:

| Mooney viscosity ML 1 + 2 at 100°C | Initial | At 70°C after 3 days | 5 days | 10 days |
|---|---|---|---|---|
| Polychloroprene prepared according to Example 5 | 87 | 84 | 87 | 90 |

With the polychloroprene rubbers obtained in the various examples adhesive compositions were prepared according to the following recipe:

| | Parts by Weight |
|---|---|
| Rubber | 100 |
| Magnesium oxide | 8 |
| Zinc oxide | 5 |
| Di-tert. butyl paracresol | 2 |
| Phenolic resin CKR 1634 (UNION CARBIDE Co.) | 40 |
| Methylethylketone | 106 |
| Ethyl acetate | 106 |
| Essence C | 85 |
| Cyclohexane | 169 |

The adhesive compositions prepared with the polychloroprene obtained according to Examples 1 to 5 were studied for any appearance of the phase separation phenomenon.

In all cases after 6 months' storage, no separation was found; the compositions were still homogeneous. This was not so with the mixtures prepared with chloroprene containing 5% of the disproportionated wood rosin mentioned in Example 1. The resistance to ageing of the polychloroprene is good but the phasing phenomenon in the adhesive composition is considerable and occurs after 2 days.

Adhesive compositions prepared from polychloroprene containing 2% of modified wood rosin do not show a marked phasing phenomenon; on the other hand, the ageing of the polychloroprene is poor.

It will be obvious to those of ordinary skill in the art that various changes and modifications may be made without departing from the scope of the invention and that the invention is not limited to what is described in the foregoing specification.

What is claimed is:

1. Process for the manufacture of polychloroprene rubber in an aqueous emulsion, comprising polymerizing chloroprene in the presence of a binary system the composition of which, by weight with regard to chloroprene, is from 1 to 2.5% of saturated and/or unsaturated fatty acids and/or alkali-metal salts thereof, and from 3 to 6% of rosin acid derivatives sufficiently modified so that it does not produce a phase separation which results from the formation of a complex between the magnesia, the phenolic resin and the rosin derivative when present together in a polychloroprene adhesive.

2. Process according to claim 1 wherein the modified rosin acid derivatives are selected from the group consisting of dimerised rosin acids, partially polymerized rosin acids, partially esterified dimerised rosin acids and oxidized wood rosins.

3. Process according to claim 2 wherein said rosin derivatives are selected from the group consisting of unmodified wood rosin, disproportionated wood rosin, hydrogenated wood rosin and their alkaline soaps.

4. As a new industrial product, the polychloroprene rubber obtained by the process of claim 1.

5. Adhesive mixtures presenting no phase separation phenomenon made from the polychloroprene rubber of claim 4.

6. A process in accordance with claim 1 wherein the system in which polymerization of chloroprene takes place is a ternary system and further includes up to 0.5% of a rosin derivative which is not modified so that it does not produce a phase separation which results from the formation of a complex between the magnesia, the phenolic resin and the rosin derivative when present together in in a polychloroprene adhesive.

7. A process in accordance with claim 1 wherein said saturated and/or unsaturated fatty acids and/or alkali-metal salts thereof consist of $C_{10}$ to $C_{14}$ saturated and/or $C_{12}$ to $C_{20}$ unsaturated fatty acids and/or alkali-metal salts thereof.

8. A process in accordance with claim 6 wherein said saturated and/or unsaturated fatty acids and/or alkali-metal salts thereof consist of $C_{10}$ to $C_{14}$ saturated and/or $C_{12}$ to $C_{20}$ unsaturated fatty acids and/or alkali-metal salts thereof.

* * * * *